United States Patent
Norrman et al.

(10) Patent No.: US 10,433,161 B2
(45) Date of Patent: Oct. 1, 2019

(54) CALL HANDOVER BETWEEN CELLULAR COMMUNICATION SYSTEM NODES THAT SUPPORT DIFFERENT SECURITY CONTEXTS

(71) Applicant: Telefonaktiebolaget L M Ericsson (publ), Stockholm (SE)

(72) Inventors: Karl Norrman, Stockholm (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1199 days.

(21) Appl. No.: 13/677,451

(22) Filed: Nov. 15, 2012

(65) Prior Publication Data

US 2013/0195268 A1 Aug. 1, 2013

Related U.S. Application Data

(60) Provisional application No. 61/592,126, filed on Jan. 30, 2012.

(51) Int. Cl.
H04K 1/00 (2006.01)
H04W 12/04 (2009.01)
H04W 36/00 (2009.01)

(52) U.S. Cl.
CPC ....... *H04W 12/04* (2013.01); *H04W 36/0038* (2013.01); *H04L 2463/061* (2013.01); *H04W 36/0066* (2013.01)

(58) Field of Classification Search
CPC ....... H04L 9/00; H04L 9/0816; H04L 9/0861; H04L 9/088; H04L 9/0894; H04L 63/00;
(Continued)

(56) References Cited

U.S. PATENT DOCUMENTS 7,840,813 B2 * 11/2010 Canard .................... G06F 21/33
705/37
7,890,643 B2 * 2/2011 Justus ................. H04L 63/0815
709/201

(Continued)

FOREIGN PATENT DOCUMENTS

CN 101860862 A 10/2010
EP 1 926 281 A2 5/2008
(Continued)

OTHER PUBLICATIONS

PCT International Search Report, dated Apr. 18, 2013, in connection with International Application No. PCT/EP2013/051550, all pages.

(Continued)

*Primary Examiner* — Thu Ha Nguyen
(74) *Attorney, Agent, or Firm* — Leffler Intellectual Property Law, PLLC

(57) ABSTRACT

In the context of facilitating a circuit switched to packet switched handover of a call in a cellular communication system, a first node (e.g., packet switched target node) generates a security context for a client whose call is being handed over. This involves the first node receiving at least one cryptographic key from a second node (e.g., a circuit switched node supporting the existing connection) and receiving identities of security algorithms supported by the client from a third node (e.g., a packet switched node supporting the existing connection); The first node uses the at least one cryptographic key and the identities to generate the security context for the client.

20 Claims, 8 Drawing Sheets

(58) Field of Classification Search
CPC ............ H04L 63/0407; H04L 63/0435; H04L 2463/061; H04W 12/00; H04W 12/04; H04W 36/0038; H04W 36/0066; H04W 12/06; H04W 36/0044; H04W 36/0072; H04W 36/0077
USPC .................. 380/247, 44, 227, 229; 455/413
See application file for complete search history.

(56) References Cited

U.S. PATENT DOCUMENTS

| | | | |
|---|---|---|---|
| 8,094,817 B2* | 1/2012 | Blom et al. | 380/44 |
| 8,341,104 B2* | 12/2012 | Manickam | G06F 21/62 706/47 |
| 8,520,850 B2* | 8/2013 | Helms | H04L 63/0428 380/201 |
| 8,606,084 B2* | 12/2013 | Haot | G11B 27/034 386/278 |
| 8,781,442 B1* | 7/2014 | Link, II | G08G 1/205 455/411 |
| 8,813,203 B2* | 8/2014 | Anderson | H04L 9/0894 726/7 |
| 8,954,739 B2* | 2/2015 | Fransen | H04L 63/06 380/277 |
| 9,032,496 B2* | 5/2015 | Mocanu | G06F 21/41 713/168 |
| 9,258,117 B1* | 2/2016 | Roth | H04L 9/0861 |
| 9,614,831 B2* | 4/2017 | Shah | H04L 63/0815 |
| 10,270,595 B2* | 4/2019 | Schliwa-Bertling | G11B 20/0021 |
| 2001/0055394 A1* | 12/2001 | Vanttinen | H04L 63/0823 380/258 |
| 2008/0150683 A1* | 6/2008 | Mikan | G07C 9/00309 340/5.31 |
| 2008/0095362 A1 | 8/2008 | Blom et al. | |
| 2008/0254833 A1* | 10/2008 | Keevill | H04L 12/5692 455/558 |
| 2008/0267114 A1* | 10/2008 | Mukherjee et al. | 370/315 |
| 2011/0041003 A1* | 2/2011 | Pattar et al. | 714/4.3 |
| 2011/0098075 A1* | 4/2011 | Bienas et al. | 455/517 |
| 2011/0150211 A1* | 6/2011 | Anderson | H04L 63/30 380/1 |
| 2011/0281584 A1* | 11/2011 | Sander et al. | 455/436 |
| 2011/0299685 A1* | 12/2011 | Hall | H04L 9/0822 380/273 |
| 2012/0150966 A1* | 6/2012 | Fan | G06Q 10/107 709/206 |
| 2012/0260019 A1* | 10/2012 | Malaiyandisamy | G06F 9/5077 711/6 |
| 2012/0278490 A1* | 11/2012 | Sennett | H04W 4/005 709/227 |
| 2012/0309375 A1* | 12/2012 | Austin | H04W 4/001 455/418 |
| 2013/0003967 A1* | 1/2013 | Norrman | H04W 12/04 380/44 |
| 2013/0007858 A1* | 1/2013 | Shah | H04L 63/0815 726/6 |
| 2013/0080769 A1* | 3/2013 | Cha | H04L 63/168 713/155 |
| 2013/0122871 A1* | 5/2013 | Shaw | H04W 4/06 455/413 |
| 2013/0128873 A1* | 5/2013 | Eipe et al. | 370/338 |
| 2013/0150011 A1* | 6/2013 | Tofighbakhsh | H04W 4/021 455/418 |
| 2013/0150072 A1* | 6/2013 | Kapoor et al. | 455/456.1 |
| 2013/0155948 A1* | 6/2013 | Pinheiro | H04W 4/005 370/328 |
| 2013/0157692 A1* | 6/2013 | Hall | H04L 12/1845 455/456.3 |
| 2013/0195268 A1* | 8/2013 | Norrman | H04W 12/04 380/247 |
| 2013/0298209 A1* | 11/2013 | Targali | H04L 63/0815 726/6 |
| 2014/0053241 A1* | 2/2014 | Norrman et al. | 726/3 |
| 2014/0086177 A1* | 3/2014 | Adjakple | H04W 12/08 370/329 |
| 2015/0092942 A1* | 4/2015 | Wager | H04L 63/061 380/270 |
| 2015/0244685 A1* | 8/2015 | Shah | G06F 21/602 713/155 |
| 2016/0007138 A1* | 1/2016 | Palanisamy | H04W 4/70 455/41.2 |
| 2016/0065362 A1* | 3/2016 | Choyi | H04L 63/065 380/279 |
| 2016/0100362 A1* | 4/2016 | Palanisamy | H04W 52/0212 370/311 |
| 2016/0323737 A1* | 11/2016 | Fransen | H04W 12/06 |
| 2017/0171782 A1* | 6/2017 | Mohamed | H04W 36/0011 |
| 2017/0195930 A1* | 7/2017 | Tomici | H04W 8/06 |
| 2017/0231020 A1* | 8/2017 | Tomici | H04L 63/0892 |
| 2017/0257843 A1* | 9/2017 | Wang | H04W 4/70 |
| 2017/0295522 A1* | 10/2017 | Shalev | H04W 36/0022 |
| 2017/0332421 A1* | 11/2017 | Sternberg | H04W 76/11 |
| 2018/0048465 A1* | 2/2018 | Schliwa-Bertling | G11B 20/0021 |
| 2018/0192234 A1* | 7/2018 | Mohamed | H04L 67/18 |
| 2018/0242147 A1* | 8/2018 | Fransen | H04W 12/04 |
| 2019/0141536 A1* | 5/2019 | Bachmutsky | H04W 12/08 |
| 2019/0150225 A1* | 5/2019 | Mohamed | H04W 76/10 |
| 2019/0166524 A1* | 5/2019 | Mohamed | H04W 36/0022 |
| 2019/0174449 A1* | 6/2019 | Shan | H04W 60/04 |
| 2019/0174466 A1* | 6/2019 | Zhang | H04W 72/042 |

FOREIGN PATENT DOCUMENTS

| | | |
|---|---|---|
| EP | 2139260 A1 | 12/2009 |
| EP | 2501164 A1 | 9/2012 |
| JP | 2009504049 A | 1/2009 |
| WO | 2007015068 A1 | 2/2007 |
| WO | 2011092138 A1 | 8/2011 |
| WO | 2011127791 A1 | 10/2011 |
| WO | 2011130681 A1 | 10/2011 |
| WO | 2011137580 A1 | 11/2011 |
| WO | 2011140695 A1 | 11/2011 |
| WO | 2011159948 A2 | 12/2011 |

OTHER PUBLICATIONS

PCT Written Opinion, dated Apr. 18, 2013, in connection with International Application No. PCT/EP2013/051550, all pages.

3GPP TS 33.102, Version 11.0.0, 3G Security; Security Architecture, Release 11, Sep. 2009, pp. 1-71, XP050554024.

3GPP TS33.401, Version 10.1.1, 3GPP System Architecture Evolution (SAE); Security architecture, Release 10, Jun. 2011, pp. 1-115, XP050553490.

3GPP TS 23.401, Version 10.5.0, General Packet Radio Service (GPRS) enhancements for Evolved Universal Terrestrial Radio Access Network (E-UTRAN) access, Release 10, Sep. 2011, pp. 1-282, XP050553747.

3GPP TS 24.008, V10.5.0 Technical Specification Group Core Network and Terminals; Mobile radio interface Layer 3 specification; Core network protocols; Stage 3 (Release 10), Dec. 2011.

3GPP TS 23.401, V10.6.0 Technical Specification Group Services and System Aspects; General Packet Radio Service (GPRS) enhancements for Evolved Universal Terrestrial Radio Access Network (E-UTRAN) access (Release 10), Dec. 2011.

3GPP TS 23.060, V10.6.0 Technical Specification Group Services and System Aspects; General Packet Radio Service (GPRS); Service description; Stage 2 (Release 10), Dec. 2011.

Summary of Japanese Office Action, dated Oct. 26, 2016, in connection with Japanese Patent Application No. 2014-553747, all pages.

European Communication dated Dec. 5, 2016 in connection with European Application No. 13702958.3, all pages.

English Translation of Russian Office Action dated Nov. 9, 2016, issued in connection with Russian Patent Application 2014135463; cover page and pp. 1-5.

(56) References Cited

OTHER PUBLICATIONS

Chinese Office Action, dated Jul. 31, 2017, in connection with Chinese Application No. 2013800073161, 5 pages.
English language translation of Chinese Office Action Summary, dated Nov. 2, 2017, in connection with Chinese Application No. 201380007316.7, 6 pages.
Chinese Search Report, dated Jul. 31, 2017, in connection with Chinese Application No. 2013800073167, 2 pages.

* cited by examiner

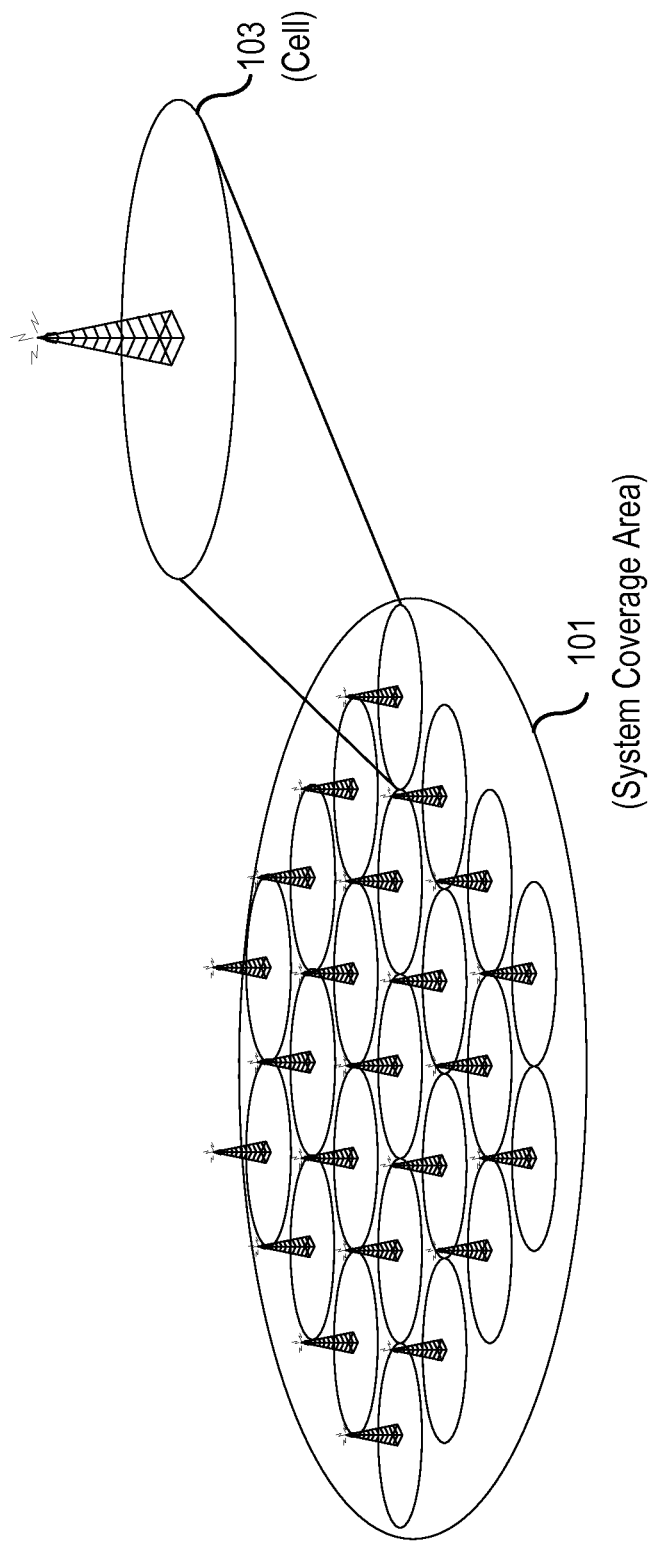
FIG. 1
(PriorArt)

CALL HANDOVER BETWEEN CELLULAR COMMUNICATION SYSTEM NODES THAT SUPPORT DIFFERENT SECURITY CONTEXTS

CROSS REFERENCE TO RELATED APPLICATIONS

This application claims the benefit of U.S. Provisional Application No. 61/592,126, filed Jan. 30, 2012, which is hereby incorporated herein by reference in its entirety.

BACKGROUND

The present invention relates to cellular communication systems, and more particularly to the handover of calls between cellular communication systems that support different security contexts.

Cellular communication systems typically comprise a land-based network that provides wireless coverage to mobile terminals that can continue to receive service while moving around within the network's coverage area. The term "cellular" derives from the fact that the entire coverage area is divided up into so-called "cells", each of which is typically served by a particular radio transceiver station (or equivalent) associated with the land-based network. Such transceiver stations are often generically referred to as "base stations", even when particular communication standards setting bodies apply different terminology (e.g., "NodeB" in WCDMA, and "eNodeB" in LTE) for the purpose of very precisely pointing out the distinctive capabilities and architectures of their version of the base station. As the mobile device moves from one cell to another, the network hands over responsibility for serving the mobile device from the presently-serving cell to the "new" cell. In this way, the user of the mobile device experiences continuity of service without having to reestablish a connection to the network. Handovers are controlled by a system-defined cell reselection mechanism. FIG. 1 illustrates a cellular communication system providing a system coverage area 101 by means of a plurality of cells 103.

As new communication systems come into existence, they bring with them new features, capabilities, and ways of handling calls. The mobile communication equipment (hereinafter referred to as "User Equipment", or "UE") must operate in a way that is compatible with the system with which it is expected to communicate. In order to provide the most flexibility with respect to usage, UEs are often designed to be compatible with more than one system. In one respect, this enables a user to continue using the UE as it is carried from a geographical area covered by one type of communication system into another area, served by a different type of communication system.

Having multi-mode capability is also useful because newer systems are often rolled out piecemeal, so that even if a user stays within the geographical confines of one operator's system, the UE may find itself at times served by older equipment, and at other times served by newer equipment. This situation is illustrated in FIG. 2, which depicts a portion of a cellular communication system in which a UE 201 is presently being served within a first cell 203 that is supported by equipment 205 that conforms to an older communications standard (e.g., one of the 2G—e.g., GERAN—or 3G—e.g., UTRAN—standards). In this example, the UE 201 is in the vicinity of a second (neighboring) cell 207 that is supported by equipment 209 that conforms to a newer communication standard (e.g., a 4G specification, such as E-UTRAN which is also known as "Long Term Evolution" or "LTE"). If the user is engaged in a call at the time that a handover should be performed from the older equipment 205 to the newer equipment 209 it would be desirable to be able to handover the call in a graceful way that minimizes the call's disruption.

However, since older communication systems are not designed with the knowledge of what information will be required to support a handover to newer equipment, designers have been faced with the problem of how best to enable such handovers to take place (i.e., how to supply the new equipment with information that puts it in the best position to pick up support for the ongoing call that is presently served by older equipment). Solutions to this problem, involving methods, apparatuses, and/or software are therefore desired.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Other objectives, features and advantages of the present invention will appear from the following non-limiting detailed disclosure, from the attached claims as well as from the drawings. Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, and the like, unless explicitly stated otherwise. The steps of any method disclosed herein do not have to be performed in the exact order disclosed, unless explicitly stated.

In accordance with one aspect of the present invention, the foregoing and other objects are achieved in, for example, methods and apparatuses for operating a first node to generate a security context for a client in a cellular communication system, wherein the first node comprises processing circuitry. Such operation includes the first node receiving at least one cryptographic key from a second node, and receiving identities of security algorithms supported by the client from a third node. The at least one cryptographic key and the identities are used to generate the security context for the client.

In some embodiments, the first and third nodes are packet switched nodes and the second node is a circuit switched node. For example, the first node can be an MME, the second node can be an MSC and the third node can be an SGSN. In some alternative embodiments, the first node is a first SGSN, the second node is an MSC and the third node is a second SGSN.

In some embodiments, operation further comprises the first node receiving one or more authentication vectors from the second node. The authentication vectors received from the second node are then discarded.

In some embodiments in which the first node is an SGSN, operation comprises using one or more of the at least one cryptographic key to protect traffic between a fourth node and the client.

In some embodiments in which the first node is an MME, operation includes deriving a key for an Access Security Management Entity (K_ASME) from one or more of the at least one cryptographic key.

In some embodiments, operation includes receiving, from the third node, packet switched encryption keys for use in a packet switched connection, and discarding the packet switched encryption keys.

In some embodiments, operation includes receiving at least one authentication vector from the third node and storing the received at least one authentication vector.

In some embodiments, operation includes receiving additional information from the third node, and in some of these embodiments using the at least one cryptographic key and the identities to generate the security context for the client includes using the at least one cryptographic key and the identities and the additional information to generate the security context for the client.

Some embodiments cover operation in both the first and second nodes, such that the second node generates at least one new cryptographic key from at least one existing key associated with the client and a nonce generated by the second node, and communicates the at least one new cryptographic key to the first node. The first node then receives identities of security algorithms supported by the client from a third node and uses the at least one cryptographic key and the identities to generate the security context for the client.

BRIEF DESCRIPTION OF THE DRAWINGS

FIG. 1 illustrates a cellular communication system providing a system coverage area by means of a plurality of cells.

DETAILED DESCRIPTION

Figure 2:
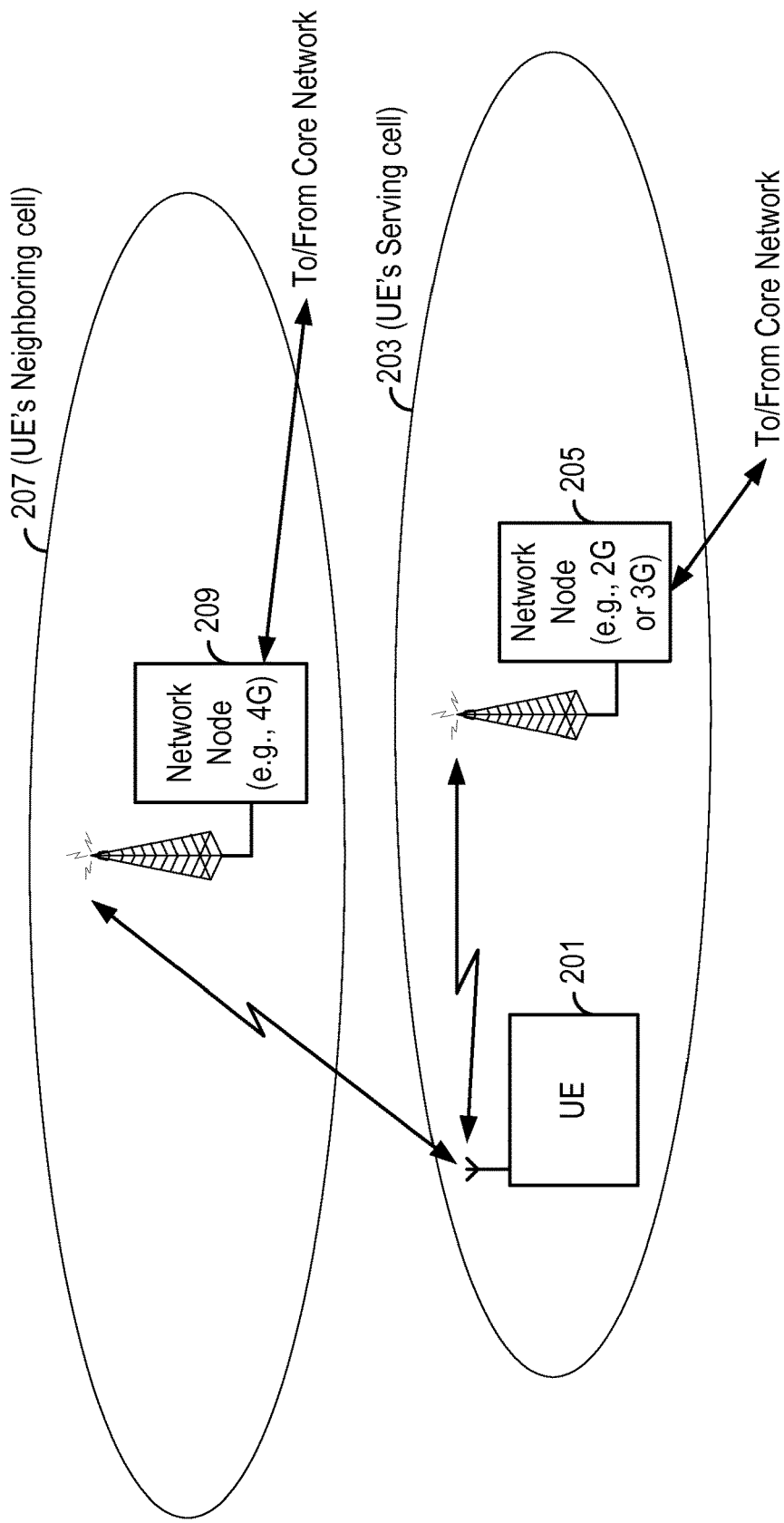
FIG. 2 depicts a portion of a cellular communication system in which a UE is presently being served within a first cell that is supported by equipment that conforms to an older communications standard (e.g., one of the 2G or 3G standards) and that should be handed over to a second cell that is supported by equipment that conforms to a newer communications standard.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

In the following disclosure, a number of abbreviations are used for the sake of conciseness and since the abbreviations are widely used in the field. Therefore, the following abbreviations and their meanings are presented with the understanding that each is standard terminology that would be readily understood by a person of ordinary skill in the art:

3GPP (3rd Generation Partnership Project)
3GPP TSG SA WG3 (3rd Generation Partnership Project Technical Specification Group System Architecture Work Group 3)
AKA (Authentication and Key Agreement)
AMF (Authentication management field)
AS (Access Stratum)
BSC (Base Station Controller)
BSS (Base Station Subsystem)
CK (Ciphering Key)
CKSN (Ciphering Key Sequence Number)
CR (Change Request)
CS (Circuit Switched)
eNB (eNodeB)
E-UTRAN (Evolved-Universal Terrestrial Radio Access Network)
EPS (Evolved Packet System)
FC (Function Code)
FFS (For Further Study)
GERAN (GSM/EDGE Radio Access Network)
HLR (Home Location Register)
HO (Handover)
HSPA (High Speed Packet Access)
HSS (Home Subscriber Server)
IE (Information Element)
IK (Integrity Key)
IMS (IP Multimedia Subsystem)
IMSI (International Mobile Subscriber Identity)
IRAT (Inter Radio Access Technology)
ISDN (Integrated Services Digital Network)
$K_{ASME}$ (Key Access Security Management Entity)
KDF (Key Derivation Function)
KSI (Key Set Identifier)

LA (Location Area)
LTE (Long Time Evolution)
ME (Mobile Equipment)
MSC (Mobile Switching Centre)
MSISDN (Mobile Subscriber ISDN)
MM (Mobility Management)
MME (Mobility Management Entity)
MS (Mobile Station)
NAS (Non-Access Stratum)
NB (Node B)
NONCE ("Number Used Once"—A (pseudo) randomly generated string of bits)
PLMN (Public Land Mobile Network)
PS (Packet Switched)
PRNG (Pseudo Random Number Generator)
RAT (Radio Access Technology)
RNC (Radio Network Controller)
RRC (Radio Resource Control)
SA (System Architecture)
SGSN (Serving GPRS Support Node)
SGW (Signaling Gateway)
SIM (Subscriber Identity Module)
SRNC (Serving RNC)
SRVCC (Single Radio Voice Call Continuity)
SQN (Sequence Number)
UE (User Equipment)
USIM (Universal Subscriber Identity Module)
UTRAN (Universal Terrestrial Radio Access Network)
UMTS (Universal Mobile Telecommunication System)
UP (User Plane)

As mentioned in the Background section of this disclosure, incompatibilities between different types of cellular communication equipment present impediments to achieving high quality handovers of calls from one type of equipment to another type. As an example, consider the problems that can arise with respect to the security context when newer, so-called "4G" equipment is to pick up responsibility for a call that is presently being served by older "2G" or "3G" equipment. Dual/multi-mode UEs that are designed to operate in 2G/3G equipment as well as in newer 4G equipment will likely have security capabilities that are specific to the 4G equipment. Therefore, the 4G network node to which a call is to be handed over should receive information indicating what the UE's 4G security parameters (e.g., keys, selected and supported ciphering algorithms, etc.) are. But consider what happens during a conventional handover from 2G/3G equipment to 4G equipment:

Any 2G/3G call (which can operate in either circuit switched—CS—or packet switched—PS—mode) that is to be handed over to 4G equipment (which operates exclusively in a PS mode) must at least be attached to an SGSN (PS equipment) even if the call is being handled by means of a connection to an MSC (CS equipment). When the UE attaches to the network in the packet switched domain it provides the SGSN with the so-called "UE Network capabilities", which includes the security algorithms that the terminal supports in E-UTRAN. Clause 6.14 of 3GPP TS 23.060 V10.6.0 (2011-12) specifies that the "radio access classmark" contains the "UE Network capability." The "UE Network capability" contains the E-UTRAN security algorithms supported by the UE. In particular, clause 6.14.1 of 3GPP TS 23.060 states that the UE (referred to in the specification as "MS", "Mobile Station" for historical reasons) sends the radio access capability to the network. The interested reader can refer to 3GPP TS 23.060 for more information about this aspect.

Looking now at the circuit switched domain, the UE does not provide the "UE Network capability" to the network (in this case, the MSC), but instead only provides its 2G/3G (UTAN/GERAN) related capabilities. This can be seen from the Location Update Request message definition that is found in clause 9.2.15 of 3GPP TS 24.008 V10.5.0 (2011-12). The Location Update Request message is used to perform the attach.

The Packet Switched Inter RAT handover from UTRAN (3G) to E-UTRAN (4G) is described in clause 5.5.2.2 of 3GPP TS 23.401 V10.6.0 (2011-12). Of particular interest is step 3 (Forward relocation request) shown in the specification as FIG. 5.5.2.2.2-1. The security parameters (e.g., keys, selected and supported ciphering algorithms, etc.) are included in the MM Context. In particular, the MM context contains security related information, such as UE Network capabilities and used UMTS integrity and ciphering algorithms(s) as well as keys, as described in clause 5.7.2 (Information Storage for MME). The UE Network capabilities includes the E-UTRAN security capabilities, which include for example the identities of the LTE encryption and integrity algorithms the UE supports (these algorithm identifiers are called EPS encryption algorithms and EPS integrity protection algorithms in the LTE security specification TS 33.401).

The Packet Switched Inter RAT handover from GERAN to E-UTRAN is described in clause 5.5.2.4 of 3GPP TS 23.401.

The principle of having the source node (SGSN for the PS domain) forward the UE Network capabilities to the target node is exactly the same as the specified handover procedure when the call originates in the CS domain. However, in the CS domain the source node is an MSC which, as mentioned above, does not have the UE's E-UTRAN security capabilities. (Indeed, in the CS domain there is no need for the MSC to have such information because the target node is also an MSC.) Consequently, conventional handovers do not provide any mechanism for supplying this information to the target node (MME in E-UTRAN).

Figure 3:
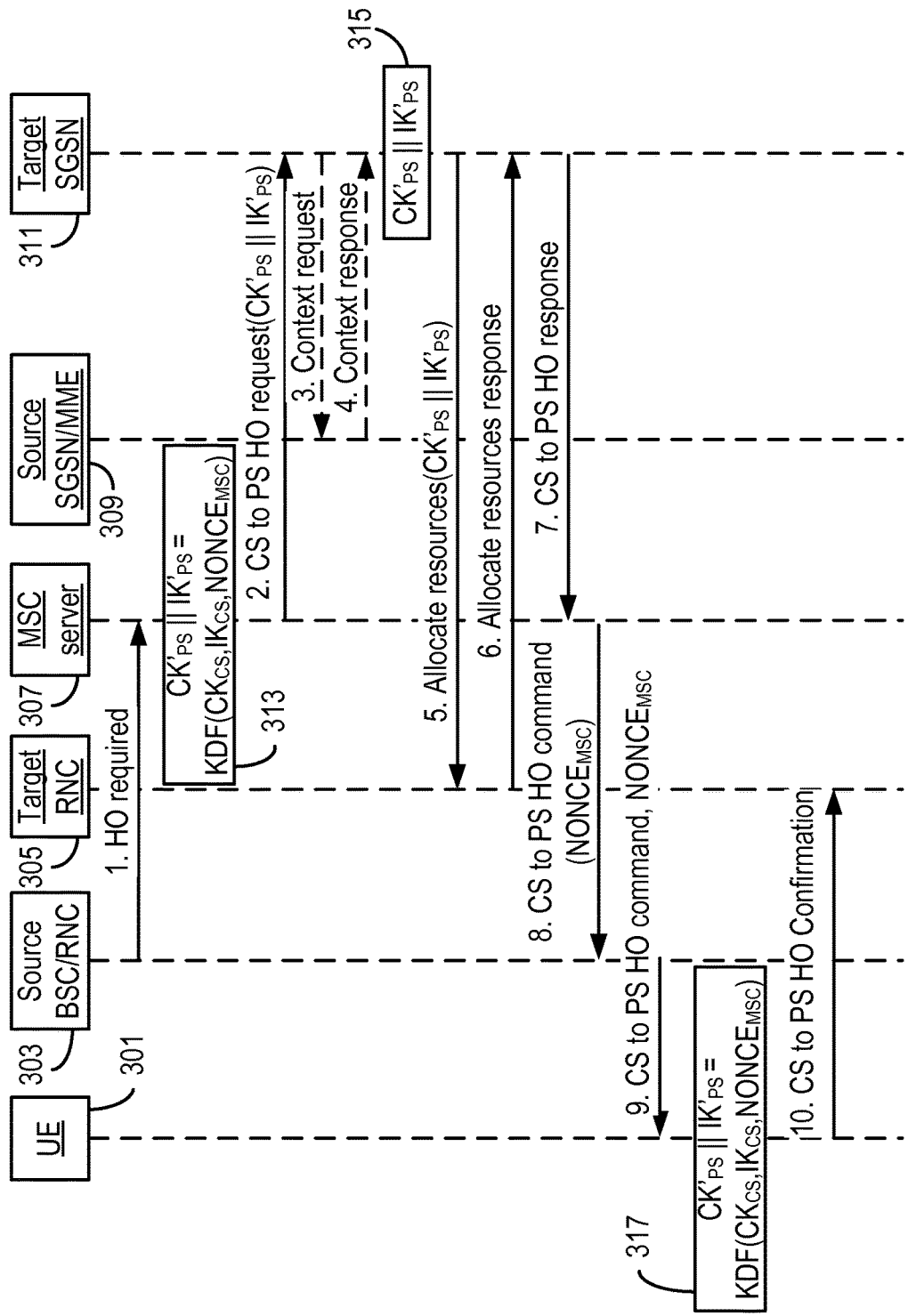
FIG. 3 depicts aspects of signaling involved in the handover of a call from source UTRAN or GERAN supporting equipment operating in the circuit switched domain to target UTRAN/GERAN supporting equipment operating in the PS domain.

This situation is illustrated in FIG. 3, which depicts aspects of signaling involved in the handover of a call from source UTRAN or GERAN supporting equipment operating in the CS domain to target UTRAN supporting equipment operating in the PS domain. The illustrated components that participate in this signaling are a UE 301, a source BSC/RNC 303, a target RNC 305, an MSC server 307, a source SGSN/MME 309, and a target SGSN 311.

Initially, the UE 301 is engaged in a CS call, supported by the various source UTRAN or GERAN equipment. In response to a decision being made to perform the CS (UTRAN or GERAN) to PS (UTRAN) handover, in step 1 the source BSC/RNC 303 sends a "HO required" message to the MSC server 307.

The MSC server 307 then generates (step 313) a NONCE$_{MSC}$, and uses this to generate a cryptographic key in accordance with:

$$CK'_{PS} \| IK'_{PS} = KDF(CK_{CS}, IK_{CS}, NONCE_{MSC}),$$

where the symbol "||" represents a concatenation function.

In step 2, the MSC server 307 communicates a "CS to PS HO request" to the target SGSN 311, and includes the generated cryptographic key ($CK'_{PS} \| IK'_{PS}$) in this message.

In response, in step 3 the target SGSN 311 sends a "Context request" to the source SGSN/MME 309 for the purpose of requesting context information for the UE 301. (Dashed lines used here and in other representations of signaling represent an optional step.) The SGSN/MME 309 then sends a "Context response" (including the requested information) back to the target SGSN 311 (step 4).

If the target SGSN 311 received a GPRS Kc' and a CKSN'$_{PS}$ from the MSC server 307 enhanced for SRVCC, then the target SGSN 311 computes (step 315) CK'$_{PS}$ and IK'$_{PS}$ from the GPRS Kc'. The target SGSN 311 associates the CK'$_{PS}$ and IK'$_{PS}$ with KSI'$_{PS}$, which is set equal to CKSN'$_{PS}$ received from the source MSC server 307 enhanced for SRVCC.

The target SGSN 311 then sends the CK'$_{PS}$, IK'$_{PS}$ to the target RNC 305 (step 5). In response, the target RNC 305 sends an Allocate resources response (step 6).

In step 7, the target SGSN 311 sends a CS to PS HO Response message to the source MSC server 307.

In step 8, the MSC server 307 sends a CS to PS HO Response to the source BSC/RNC 303. This CS to PS HO Response includes, among other things, the NONCE$_{MSC}$.

In step 9, the source BSC/RNC 303 sends a CS to PS HO command to the UE 301. This command includes, among other things, the NONCE$_{MSC}$. The UE 301 uses the received NONCE$_{MSC}$ to derive CK'$_{PS}$ and IK'$_{PS}$ using key derivation formulas specified by the applicable standard (step 317).

In step 10, the UE 301 returns a CS to PS HO Confirmation to the target RNC 305. The CK'$_{PS}$ AND IK'$_{PS}$ become the active key set both in the UE 301 and in the target RNC 305.

Figure 4:
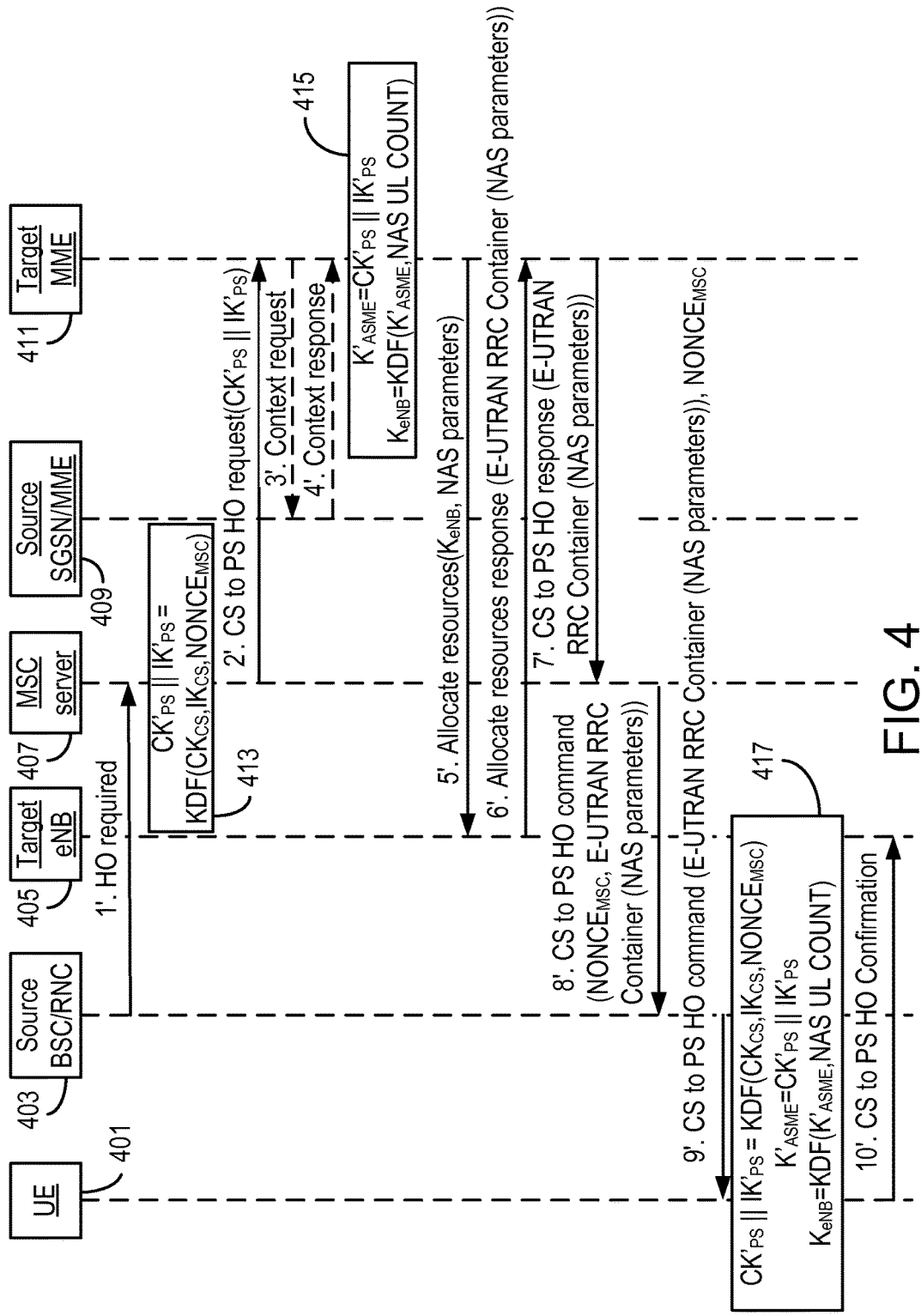
FIG. 4 depicts aspects of signaling involved in the handover of a call from source UTRAN or GERAN supporting equipment operating in the CS domain to target E-UTRAN (i.e., 4G equipment) supporting equipment operating in the PS domain.

An alternative illustration of the same type of situation is illustrated in FIG. 4, which depicts aspects of signaling involved in the handover of a call from source UTRAN or GERAN supporting equipment operating in the CS domain to target E-UTRAN (i.e., 4G equipment) supporting equipment operating in the PS domain. The illustrated components that participate in this signaling are a UE 401, a source BSC/RNC 403, a target eNB 405, an MSC server 407, a source SGSN/MME 409, and a target MME 411.

Initially, the UE 401 is engaged in a CS call, supported by the various source UTRAN or GERAN equipment. In response to a decision being made to perform the CS (UTRAN or GERAN) to PS (E-UTRAN) handover, in step 1' the source BSC/RNC 403 sends a "HO required" message to the MSC server 407.

The MSC server 407 then generates (step 413) a NONCE$_{MSC}$, and uses this to generate a cryptographic key in accordance with:

CK'$_{PS}$∥IK'$_{PS}$=KDF(CK$_{CS}$, IK$_{CS}$, NONCE$_{MSC}$), where the symbol "∥" represents a concatenation function.

In step 2', the MSC server 407 communicates a "CS to PS HO request" to the target MME 411, and includes the generated cryptographic key (CK'$_{PS}$∥IK'$_{PS}$) in this message.

In response, in step 3' the target MME 411 sends a "Context request" to the source SGSN/MME 409 for the purpose of requesting context information for the UE 401. The SGSN/MME 409 then sends a "Context response" (including the requested information) back to the target MME 411 (step 4').

In step 415, the target MME 411 creates a mapped EPS security context by setting the K'$_{ASME}$ of the mapped EPS security context equal to the concatenation CK'$_{PS}$∥IK'$_{PS}$ where the CK'$_{PS}$ and IK'$_{PS}$ were received in the CS to PS handover request (see step 2'). The target MME 411 further associates the K'$_{ASME}$ with a KSI$_{SGSN}$. The value of the KSI$_{SGSN}$ is the same as the value of the KSI'$_{PS}$ received in the CS to PS handover request.

Also as part of step 415, the target MME 411 derives K$_{eNB}$ by applying the KDF as defined in the applicable standard, using the mapped key K'$_{ASME}$ and $2^{32}-1$ as the value of the uplink NAS COUNT parameter. The uplink and downlink NAS COUNT values for the mapped EPS security context are set to start value (i.e., 0) in the target MME 411.

The target MME 411 then sends the K$_{eNB}$ and NAS parameters to the target eNB 405 (step 5'). In response, the target eNB 405 sends an Allocate resources response (step 6').

In step 7', the target MME 411 sends a CS to PS HO Response message to the source MSC server 407.

In step 8', the MSC server 407 sends a CS to PS HO Response to the source BSC/RNC 403. This CS to PS HO Response includes, among other things, the NONCE$_{MSC}$.

In step 9', the source BSC/RNC 403 sends a CS to PS HO command to the UE 401. This command includes, among other things, the NONCE$_{MSC}$. The UE 401 uses the received NONCE$_{MSC}$ to derive K'$_{ASME}$, associate it with KSI$_{SGSN}$ received in the NAS Security Transparent Container IE and derive NAS keys and K$_{eNB}$ following the same key derivations as the MSC server 407 and target MME 411 performed in steps 2', 3' and 4' (step 417), all as specified by the applicable standard.

In step 10', the UE 401 returns a CS to PS HO Confirmation to the target eNB 405. The mapped EPS security context established as above becomes the current EPS security context at AS.

Figure 5:
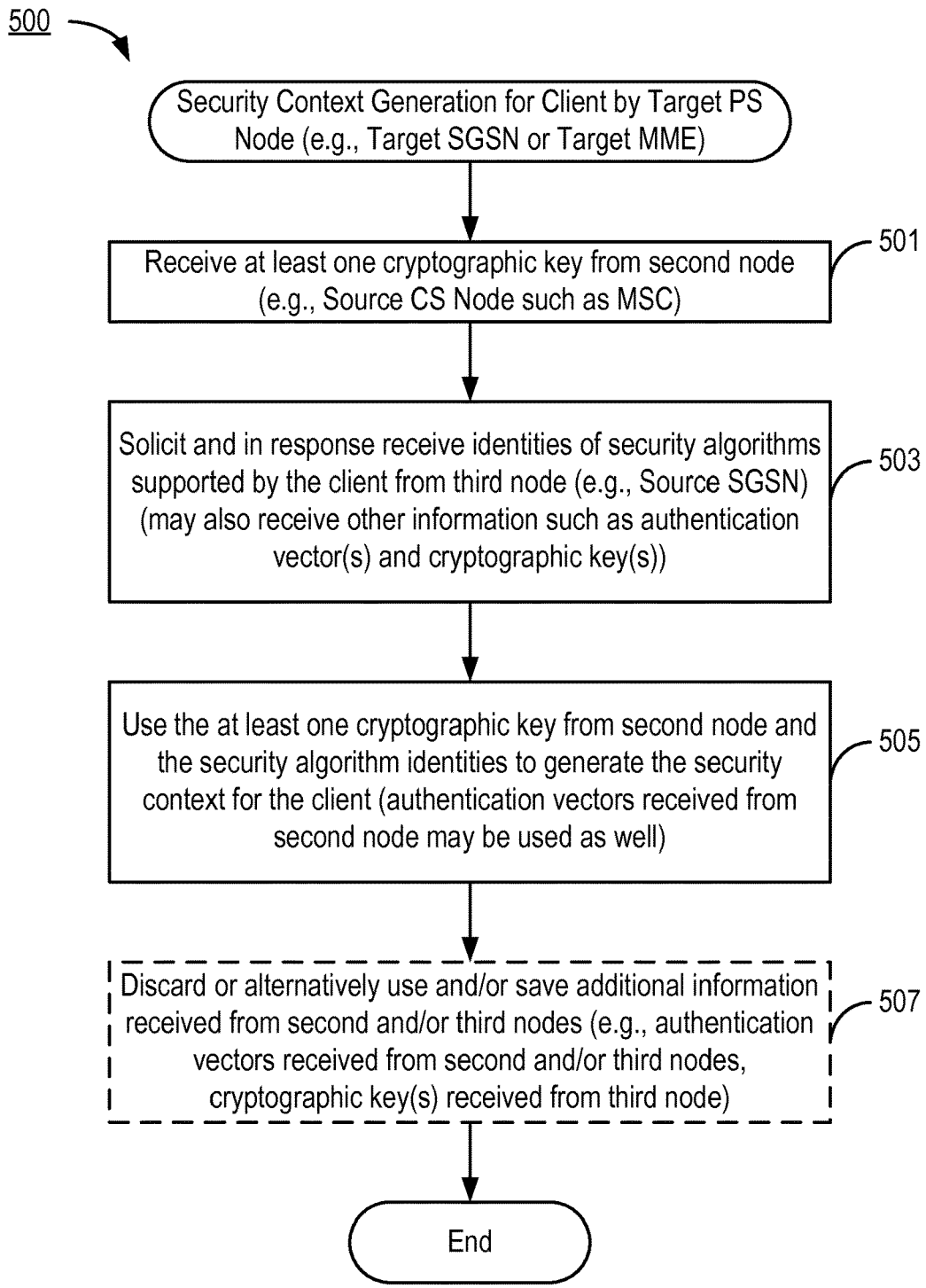
FIG. 5 is, in one respect, a flow chart of steps/processes performed by a target PS node in accordance with some but not necessarily all exemplary embodiments of a handover mechanism consistent with the invention.

A new handover mechanism addresses the problems with the conventional techniques. Aspects of this new handover mechanism are depicted in FIG. 5, which in one respect is a flow chart of steps/processes performed by a target PS node (e.g., a Target SGSN or Target MME) in accordance with some but not necessarily all exemplary embodiments of the invention. In another respect, FIG. 5 can be considered to depict exemplary means 500 comprising the various illustrated circuitry (e.g., hard-wired and/or suitably programmed processor) configured to perform the described functions.

For ease of terminology, the target PS node can, in the context of this processing, be considered a "first node" that generates a security context for a client in a cellular communication system. In one aspect, the first node receives at least one cryptographic key from a second node (step 501). The second node can be a source CS node such as an MSC.

The first node solicits from a third node (e.g., a source SGSN), and in response receives, identities of security algorithms supported by the client (step 503). In some but not necessarily all embodiments, the first node may also receive other information such as one or more authentication vectors and/or cryptographic key(s).

The first node then uses the at least one cryptographic key received from the second node and the security algorithm identities to generate the security context for the client (step 505). In some but not necessarily all embodiments, authentication vectors received from the second node may be used as well.

At this, point, the first node has generated the security context for the client. In some but not necessarily all embodiments, the first node may perform any one or combination of additional functions, such as but not limited to:
  discarding additional information received from the second and/or third nodes (e.g., authentication vectors received from the second and/or third nodes, cryptographic key(s) received from the third node)
  using (e.g., if the target PS node is an SGSN) and/or saving (e.g., if the target PS node is an MME) additional information received from the second and/or third nodes (e.g., authentication vectors received from the second and/or third nodes). Saving the authentication vectors can be useful, for example, if the target PS node is an MME and a later handover will be made to the exact same source SGSN from which they were received (in which case, the authentication vectors are returned to the SGSN at the time of that later handover).

Figure 6:
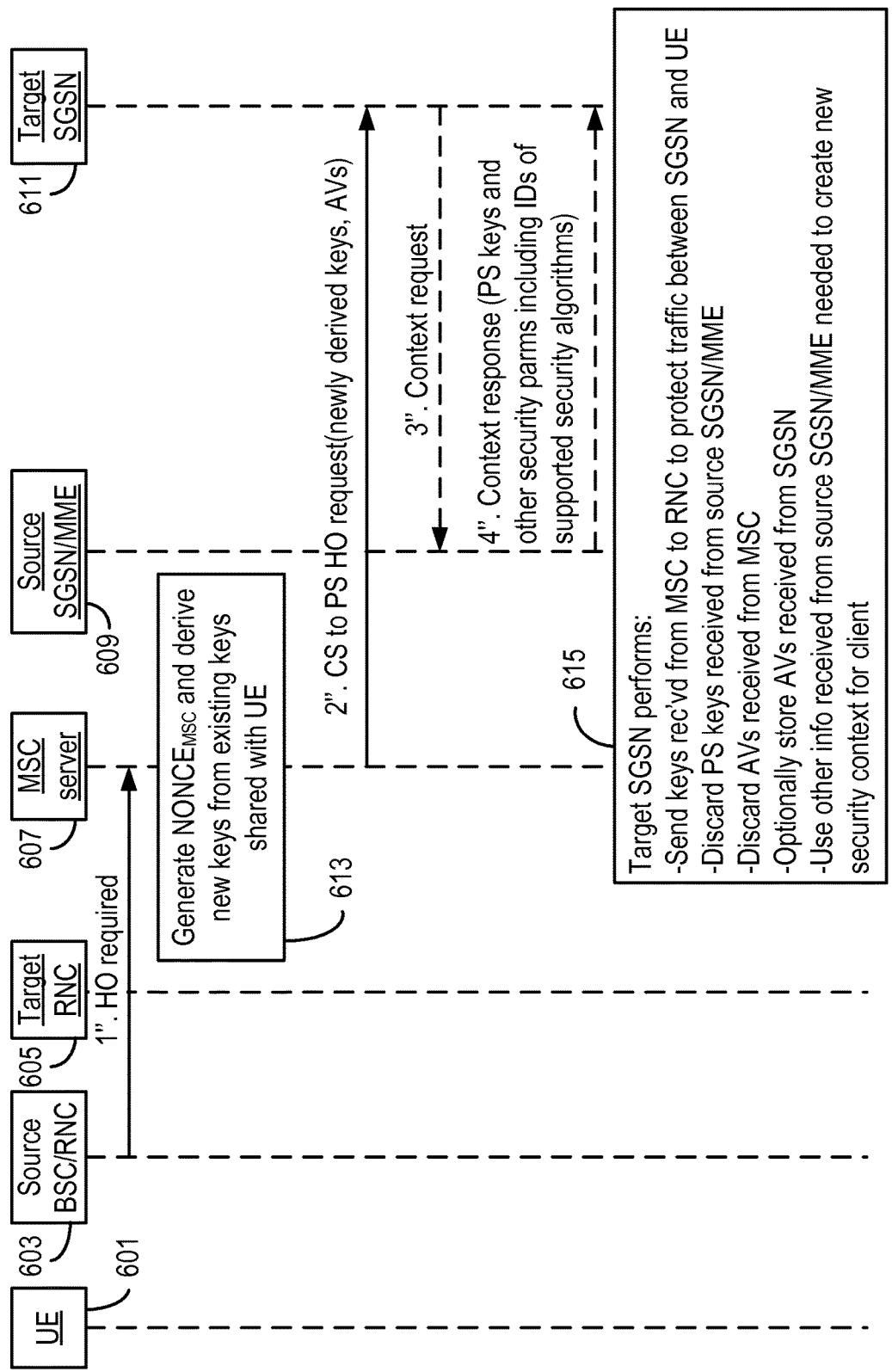
FIG. 6 is a signaling diagram of aspects of one embodiment of handover signaling and steps consistent with the invention.

Additional aspects of embodiments consistent with the invention can be appreciated from FIG. 6, which is a signaling diagram of one embodiment consistent with the invention. In particular, this diagram focuses on aspects that support a target PS node being able to create a security context for a client as part of a handover of a call from source UTRAN or GERAN supporting equipment operating in the CS domain to target UTRAN supporting equipment operating in the PS domain. An aspect of the illustrated embodiment is that the target PS node collects security related information from the source PS node and also from the source CS node, and selected parts of the collected information are combined to generate a new set of security related information. This is described in greater detail in the following.

The illustrated components that participate in the signaling of this exemplary embodiment are a UE 601 (client), a source BSC/RNC 603, a target RNC 605, an MSC server 607, a source SGSN/MME 609, and a target SGSN 611.

Initially, the UE 601 is engaged in a CS call, supported by the various source UTRAN or GERAN equipment. In response to a decision being made to perform the CS (UTRAN or GERAN) to PS (UTRAN/GERAN) handover, in step 1" the source BSC/RNC 603 sends a "HO required" message to the MSC server 607.

The MSC server 607 then generates (step 613) a NONCE$_{MSC}$, and uses this and existing keys shared with the UE 601 to generate a cryptographic key in accordance with:

$$CK'_{PS}\|IK'_{PS}=KDF(CK_{CS}, IK_{CS}, NONCE_{MSC}),$$

where the symbol "$\|$" represents a concatenation function.

In step 2", the MSC server 607 communicates a "CS to PS HO request" to the target SGSN 611, and includes the generated cryptographic key ($CK'_{PS}\|IK'_{PS}$) and authentication vectors in this message.

In response, in step 3" the target SGSN 611 sends a "Context request" to the source SGSN/MME 609 for the purpose of requesting context information for the UE 601. (Dashed lines used here and in other representations of signaling represent an optional step.) The SGSN/MME 609 then sends a "Context response" (including the requested information which includes the PS cryptographic keys and other security parameters such as the IDs of security algorithms supported by the UE 601) back to the target SGSN 611 (step 4").

In step 615, the target SGSN 611 performs:

Sending the cryptographic keys received from the MSC 607 to the target RNC 605 for the purpose of protecting traffic between the target SGSN 611 and the UE 601 (i.e., the client)

Discarding any PS keys received from the source SGSN/MME 609

Discarding the AVs that were received from the MSC server 607

In some but not necessarily all embodiments, storing AVs received from the source SGSN 609

In some but not necessarily all embodiments, the data in the AVs may be used to re-authenticate the UE 601

Using other information received from the source SGSN/MME 609 needed to create a new security context for the client (i.e., the UE 601)

Following step 615, the signaling is in accordance with steps 5, 6, 7, 8, 9, and 10 such as are shown in FIG. 3 and described in FIG. 3's supporting text above.

Figure 7:
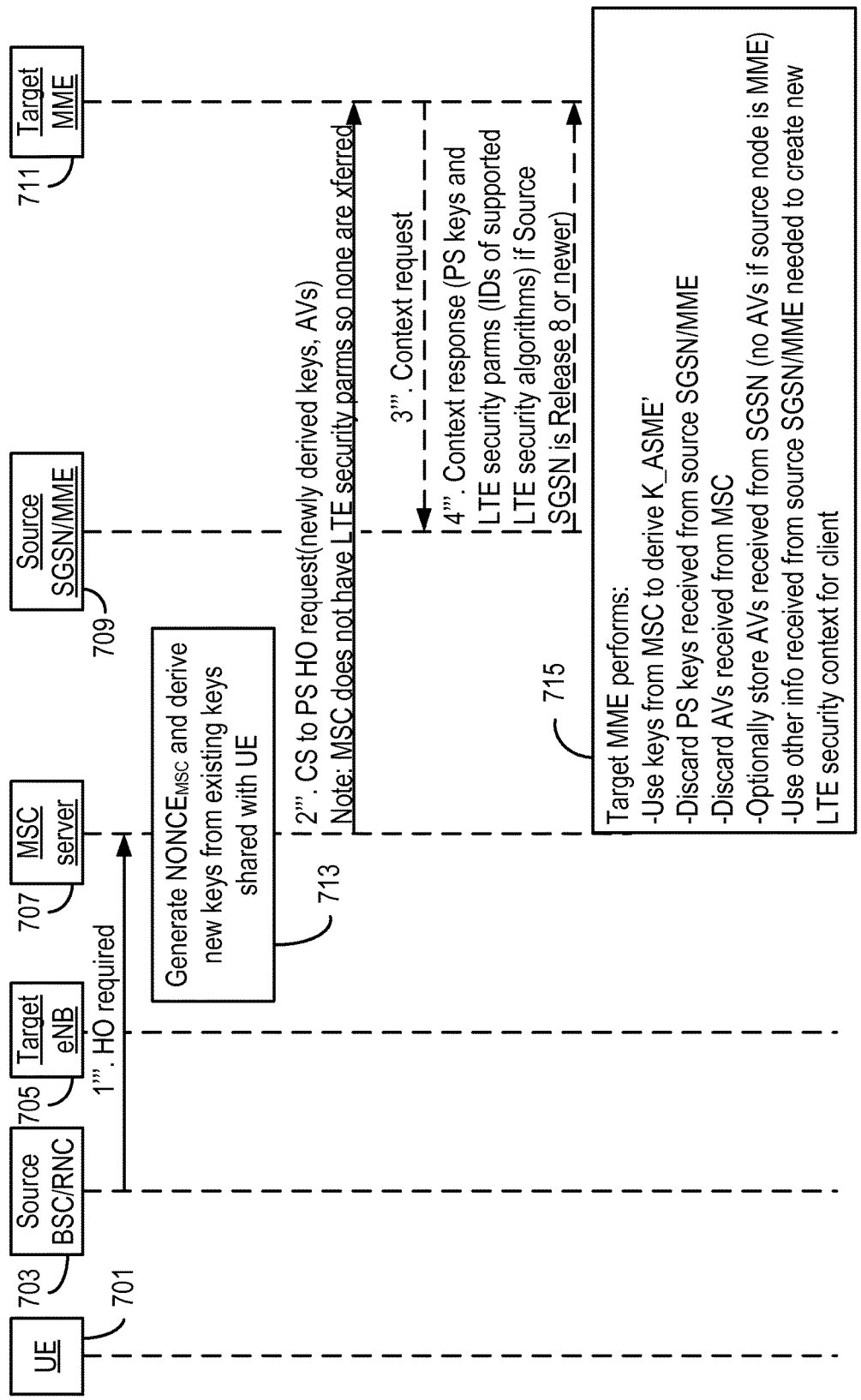
FIG. 7 is a signaling diagram of an alternative embodiment of handover signaling and steps consistent with the invention.

Other aspects of embodiments consistent with the invention can be appreciated from FIG. 7, which is a signaling diagram of an alternative embodiment consistent with the invention. In particular, this diagram focuses on aspects that support a target PS node being able to create a security context for a client as part of a handover of a call from source UTRAN or GERAN supporting equipment operating in the CS domain to target E-UTRAN (i.e., 4G) supporting equipment operating in the PS domain. The illustrated components that participate in this signaling are a UE 701 (client), a source BSC/RNC 703, a target eNB 705, an MSC server 707, a source SGSN/MME 709, and a target MME 711.

Initially, the UE 701 is engaged in a CS call, supported by the various source UTRAN or GERAN equipment. In response to a decision being made to perform the CS (UTRAN or GERAN) to PS (E-UTRAN) handover, in step 1''' the source BSC/RNC 703 sends a "HO required" message to the MSC server 707.

The MSC server 707 then generates (step 713) a NONCE$_{MSC}$, and uses this to generate new cryptographic keys from existing keys shared with the UE 701. This key derivation is in accordance with:

$$CK'_{PS}\|IK'_{PS}=KDF(CK_{CS}, IK_{CS}, NONCE_{MSC}),$$

where the symbol "$\|$" represents a concatenation function.

In step 2''', the MSC server 707 communicates a "CS to PS HO request" to the target MME 711, and includes the newly generated cryptographic keys ($CK'_{PS}\|IK'_{PS}$) and AVs in this message. It will be observed that the MSC server 707 does not have LTE security parameters, so none are (or can be) transferred in this communication.

In response, in step 3''' the target MME 711 sends a "Context request" to the source SGSN/MME 709 for the purpose of requesting context information for the UE 701. The SGSN/MME 709 then sends a "Context response" (including the requested information) back to the target MME 711 (step 4'''). This requested information includes PS keys and LTE security parameters (i.e., IDs of LTE security algorithms that are supported by the UE 701). In the context of a source SGSN 709, such information is available if the source SGSN 709 complies with Release 8 or newer of the LTE standard.

In step 715, the target MME 711 performs:

Creating a mapped EPS security context by setting the $K'_{ASME}$ of the mapped EPS security context equal to the concatenation $CK'_{PS}\|IK'_{PS}$, where the $CK'_{PS}$ and $IK'_{PS}$ were received in the CS to PS handover request (see step 2'''). The target MME 711 further associates the $K'_{ASME}$ with a $KSI_{SGSN}$. The value of the $KSI_{SGSN}$ is the same as the value of the $KSI'_{PS}$ received in the CS to PS handover request. Also as part of this step, the target MME 711 derives $K_{eNB}$ by applying the KDF as defined in the applicable standard, using the mapped key $K'_{ASME}$ and $2^{32}-1$ as the value of the uplink NAS COUNT parameter. The uplink and downlink NAS COUNT values for the mapped EPS security context are set to start value (i.e., 0) in the target MME 711.

Discarding PS keys received from the source SGSN/MME 709

Discarding AVs received from the MSC server 707

Optionally storing AVs received from a source SGSN 709. (There will not be any AVs received from a source MME 709.) These stored AVs can later be used if there is to be a PS IRAT HO back to the very same source SGSN 709 as the one from which they were received (in which case they are transferred back to that SGSN at the time of that later handover).

Using other information received from the source SGSN/MME 709 needed to create an LTE security context for the UE 701 (i.e., for the client). Such additional information can be, for example, the KSI or the CKSN, each of which is a 3-bit long string. For example, the MME 711 can use the KSI/CKSN to identify the security context in LTE.

Following step 715, the signaling is in accordance with steps 5', 6', 7', 8', 9', and 10' such as are shown in FIG. 4 and described in FIG. 4's supporting text above.

Figure 8:
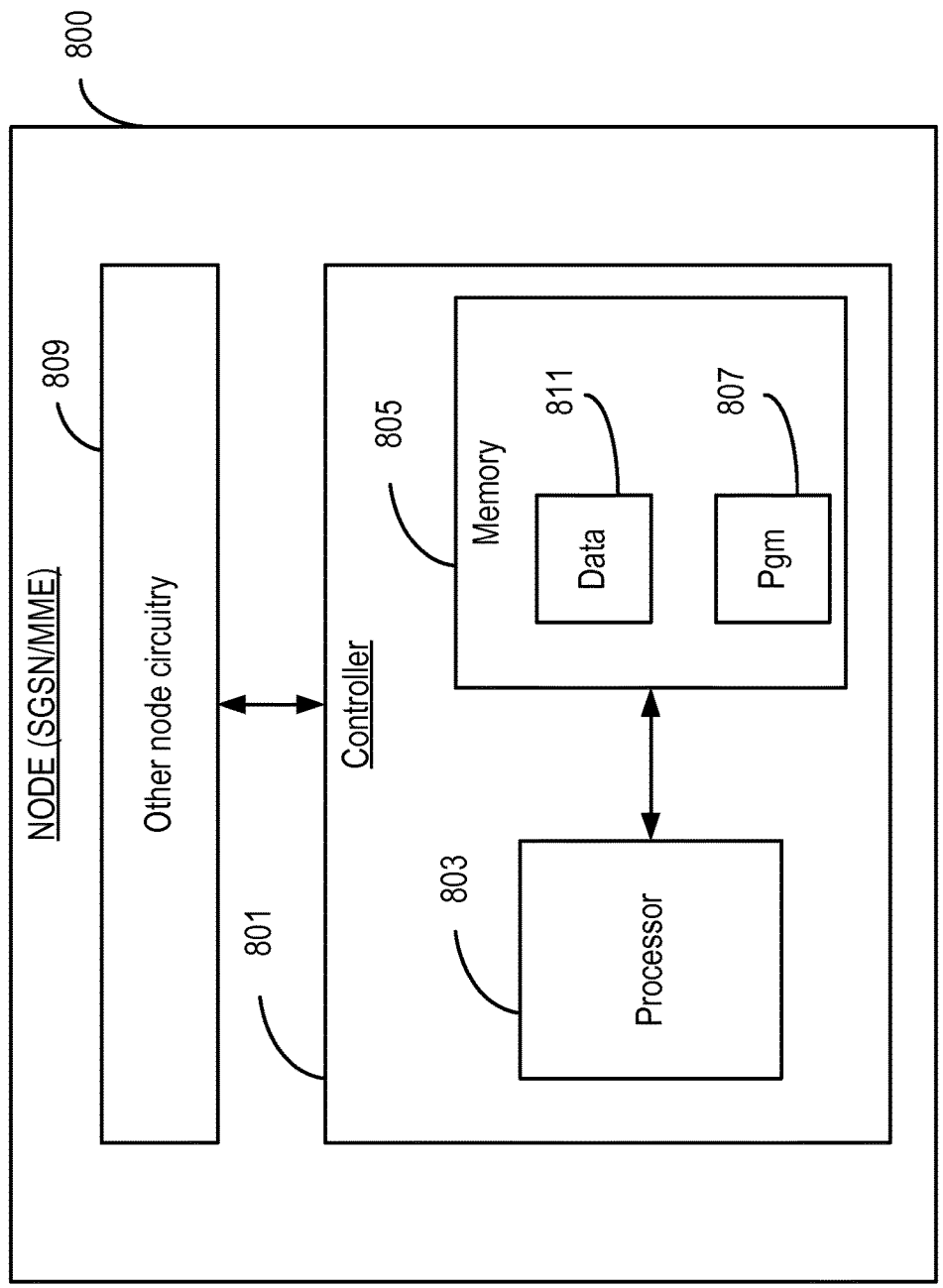
FIG. 8 is a block diagram of a target node (e.g., SGSN/MME) that operates in the PS domain.

FIG. 8 is a block diagram of a target node 800 (e.g., SGSN/MME) that operates in the PS domain, wherein the target node 800 comprises a controller 801 that is circuitry configured to carry out, in addition to typical communications system node functionality, any one or any combination of the aspects described in connection with any one or combination of FIGS. 5 through 7 above. Such circuitry could, for example, be entirely hard-wired circuitry (e.g., one or more ASICs). Depicted in the exemplary embodiment of FIG. 8, however, is programmable circuitry, comprising a processor 803 coupled to one or more memory devices 805 (e.g., Random Access Memory, Magnetic Disc Drives, Optical Disk Drives, Read Only Memory, etc.). The memory device(s) 805 store program means 807 (e.g., a set of processor instructions) configured to cause the processor 803 to control other node circuitry/hardware components 809 so as to carry out any of the functions described above. The memory 805 may also store data 811 representing various constant and variable parameters as may be received, generated, and/or otherwise needed by the processor 803 when carrying out its functions such as those specified by the program means 807.

The various aspects of embodiments consistent with the invention as described above provide solutions to the problems relating to the handover of calls between CS and PS equipment, including the problem of how to generate a security context that is useful in the PS domain when the call has originated in the CS domain.

The invention has been described with reference to particular embodiments. However, it will be readily apparent to those skilled in the art that it is possible to embody the invention in specific forms other than those of the embodiment described above.

For example, the various aspects, such as obtaining some information from a source CS node and other information from a source PS node and filtering and/or processing this information to derive a security context that is useful in the target PS node are applicable even when some other details have changed. As an example, embodiments can be foreseen in which, instead of having an MSC generate a NONCE that is communicated to the target PS node (e.g., target SGSN or MME), the target node (target MME) can generate a NONCE itself, and then derive cryptographic keys from this generated NONCE.

Accordingly, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a first node to generate a security context for a client in a cellular communication system, wherein the first node comprises processing circuitry, the method comprising:
   the first node performing, as part of a handover in the cellular communication system:
   receiving at least one cryptographic key from a second node;
   receiving identities of security algorithms supported by the client from a third node;
   using the at least one cryptographic key and the identities to generate the security context for the client; and
   using the generated security context to, at least in part, control security-related signaling between the client and the cellular communication system,
   wherein the first node is a target packet switched node, the third node is a source packet switched node, and the second node is a source circuit switched node.

2. The method of claim 1, wherein the first node is an MME, the second node is an MSC and the third node is an SGSN.

3. The method of claim 1, wherein the first node is a first SGSN, the second node is an MSC and the third node is a second SGSN.

4. The method of claim 1, further comprising:
   causing the first node to receive one or more authentication vectors from the second node; and
   discarding the authentication vectors received from the second node.

5. The method of claim 1, wherein the first node is an SGSN, and wherein the method further comprises:
   using one or more of the at least one cryptographic key to protect traffic between a fourth node and the client.

6. The method of claim 1, wherein the first node is an MME, and wherein the method further comprises:
   deriving a key for an Access Security Management Entity (K_ASME) from one or more of the at least one cryptographic key.

7. The method of claim 1, further comprising:
   receiving, from the third node, packet switched encryption keys for use in a packet switched connection; and
   discarding the packet switched encryption keys.

8. The method of claim 1, further comprising:
   receiving at least one authentication vector from the third node; and
   storing the received at least one authentication vector.

9. The method of claim 1, further comprising receiving additional information from the third node; and
   wherein using the at least one cryptographic key and the identities to generate the security context for the client comprises using the at least one cryptographic key and the identities and the additional information to generate the security context for the client.

10. A method of operating first and second, nodes in a cellular communication system, the method operating to generate a security context as part of a process of handing over support of a client from the second node to the first node, wherein the first and second nodes each comprise processing circuitry, the method comprising:
    the second node generating at least one new cryptographic key from at least one existing key associated with the client and a nonce generated by the second node;
    the second node communicating the at least one new cryptographic key to the first node;
    the first node receiving identities of security algorithms supported by the client from a third node;

the first node using the at least one new cryptographic key and the identities to generate the security context for the client; and using the generated security context to, at least in part, control security-related signaling between the client and the cellular communication system, wherein the first node is a target packet switched node, the third node is a source packet switched node, and the second node is a source circuit switched node.

11. An apparatus for operating a first node to generate a security context for a client in a cellular communication system, the apparatus comprising:

circuitry configured to receive at least one cryptographic key from a second node;

circuitry configured to receive identities of security algorithms supported by the client from a third node;

circuitry configured to use, as part of a handover in the cellular communication system, the at least one cryptographic key and the identities to generate the security context for the client; and circuitry configured to use the generated security context to, at least in part, control security-related signaling between the client and cellular communication system, wherein the first node is a target packet switched node, the third node is a source packet switched node, and the second node is a source circuity switched node.

12. The apparatus of claim 11, wherein the first node is an MME, the second node is an MSC and the third node is an SGSN.

13. The apparatus of claim 11, wherein the first node is a first SGSN, the second node is an MSC and the third node is a second SGSN.

14. The apparatus of claim 11, further comprising:
circuitry configured to receive one or more authentication vectors from the second node; and
circuitry configured to discard the authentication vectors received from the second node.

15. The apparatus of claim 11, wherein the first node is an SGSN, and wherein the apparatus further comprises:
circuitry configured to use one or more of the at least one cryptographic key to protect traffic between a fourth node and the client.

16. The apparatus of claim 11, wherein the first node is an MME, and wherein the apparatus further comprises:
circuitry configured to derive a key for an Access Security Management Entity (K_ASME) from one or more of the at least one cryptographic key.

17. The apparatus of claim 11, further comprising:
circuitry configured to receive, from the third node, packet switched encryption keys for use in a packet switched connection; and
circuitry configured to discard the packet switched encryption keys.

18. The apparatus of claim 11, further comprising:
circuitry configured to receive at least one authentication vector from the third node;
and circuitry configured to store the received at least one authentication vector.

19. The apparatus of claim 11, further comprising circuitry configured to receive additional information from the third node; and
wherein the circuitry configured to use the at least one cryptographic key and the identities to generate the security context for the client comprises circuitry configured to use the at least one cryptographic key and the identities and the additional information to generate the security context for the client.

20. An apparatus for operating first and second nodes in a cellular communication system, the apparatus operating to generate a security context as part of a process of handing over support of a client from the second node to the first node, the apparatus comprising:

second node circuitry configured to generate at least one new cryptographic key from at least one existing key associated with the client and a nonce generated by the second node;

second node circuitry configured to communicate the at least one new cryptographic key to the first node;

first node circuitry configured to receive identities of security algorithms supported by the client from a third node;

first node circuitry configured to use the at least one new cryptographic key and the identities to generate the security context for the client; and circuitry configured to use the generated security context to, at least in part, control security-related signaling between the client and the cellular communication system, wherein the first node is a target packet switched node, the third node is a source packet switched node, and the second node is a source circuity switched node.

* * * * *